United States Patent Office 3,654,359
Patented Apr. 4, 1972

3,654,359
PROCESS FOR SYNTHESIZING SULFIMINIUM CHLORIDE
Eugene P. Gosselink, Colerain Township, Hamilton County, and Robert G. Laughlin, Springfield Township, Hamilton County, Ohio, assignors to The Procter & Gamble Company, Cincinnati, Ohio
No Drawing. Filed Oct. 20, 1969, Ser. No. 867,924
Int. Cl. C07c 145/00
U.S. Cl. 260—551 S                                 8 Claims

ABSTRACT OF THE DISCLOSURE

Dialkyl sulfiminium chloride is prepared in high yield and purity by reacting chloramine with dialkyl sulfide under special conditions to avoid formation of dialkyl sulfilimine which is unstable. Embodiments of this invention are (A) the use of specific solvents, (B) the use of carbon dioxide as an acidic buffer, and (C) both (A) and (B) together.

BACKGROUND OF THE INVENTION

This invention relates to a process for the preparation of long chain, asymmetrical, dialkyl sulfiminium chlorides by reaction of the corresponding dialkyl sulfides with chloramines. These sulfiminium chlorides are useful as chemical intermediates in the preparation of valuable organic compounds such as sulfoximine surfactants and bis (sulfuranylidene) ammonium compounds.

The most common prior-art process for the preparation of the useful dialkyl sulfoximine compounds mentioned above involves the use of hydrazoic acid (or its equivalent, sodium azide plus sulfuric acid) upon the corresponding sulfoxide or sulfide. Although useful in the laboratory these reactions are unsatisfactory as a commercial synthesis because hydrazoic acid and its salts are severely unstable and toxic. As described in Sax, "Dangerous Properties of Industrial Materials," 3rd edition, pp. 442–3, 820, 1099, these compounds decompose explosively when set off by shock or heat; react violently upon exposure to moisture, acids, or oxidizing agents; and may cause death or permanent injury after very short exposure to small quantities by either inhalation or ingestion.

An alternative synthesis involves first reacting dialkyl sulfide with chloramine to form sulfiminium chloride; then oxidizing the sulfiminium chloride to form the desired sulfoximine:

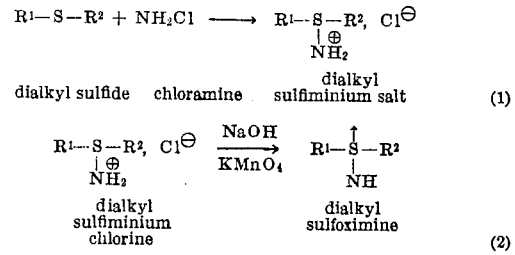

Both of these steps have been proposed by Appel et al., Chem. Ber. 95, 849–866 (1962) and 99, 3108 (1966). However, the first step of this synthesis is inadequate for the purposes of the present invention because (a) it deals with only dimethyl and diethyl compounds whereas long chain alkyl groups are most generally needed for surfactants and antibacterials, and (b) yield and purity of sulfiminium chloride are low; in fact usually the major reaction product is a diimine or diimine salt. The highest sulfiminium chloride yields reported were 31% based on sulfide and 12% based on chlorine fed to the chloramine generator.

It can be appreciated that a method safer than the hydrazoic acid route and more selective and efficient than the prior art chloramine route would be desirable. Accordingly, it is the object of the instant invention to provide a safe and commercially attractive process for synthesizing long chain asymmetrical dialkyl sulfiminium chlorides in high yield and purity. This invention is not concerned with succeeding oxidation step (Equation 2) wherein the dialkyl sulfiminium chlorides are converted into sulfoximines.

SUMMARY OF THE INVENTION

In essence, this invention involves significant improvements to the known reaction of chloramine with dialkyl sulfide to form sulfiminium chloride. These improvements provide the sulfiminium chloride product in unexpectedly high yield and purity.

Chloramine is ordinarily accompanied by free ammonia which reacts with the sulfiminium chloride as it is formed to produce an unstable, reactive compound, the sulfilimine. The desirable result of the present invention is accomplished by taking certain steps to avoid forming this unstable, reactive sulfilimine. More specifically these steps comprise (A) precipitating the product sulfiminium chloride, or (B) precipitating the free ammonia, or (C) precipitating both the sulfiminium chloride and the free ammonia.

Embodiments of the invention which cause the above-mentioned precipitations, respectively, are (A) carrying out the chloramination reaction in specific selected solvents, or (B) carrying out the chloramination reaction in the presence of carbon dioxide as an acidic buffer, or (C) a combination of step (A) and step (B).

DETAILS OF THE INVENTION

The benefits of the instant invention can be achieved by carrying out the following process steps, which are discussed in detail infra:

(a) bringing together chlorine and an excess of ammonia to form an exit-gas mixture of chloramine, free ammonia, and nitrogen, (b) dissolving dialkyl sulfide in a solvent, to form a solution thereof, (c) introducing the exit-gas mixture of step (a) into the solution of step (b), (d) reacting the chloramine with the dialkyl sulfide to form the corresponding dialkyl sulfiminium chloride, and simultaneously (e) precipitating the free ammonia; the sulfiminium chloride; or both the ammonia and the sulfiminium chloride.

Step (a).—Chloramine can be generated by bringing together chlorine and ammonia in any convenient way, such as the various methods described in U.S. Pat. 3,226,-425, granted Dec. 28, 1965 to W. T. Barrett. According to all of these techniques it is intended to obtain the desired chloramine $NH_2Cl$ without forming the undesired and potentially explosive dichloramine $NHCl_2$ and trichloramine $NCl_3$. The conventional means to accomplish this is to work under conditions of excess ammonia. For reasons that will become apparent hereinafter, gas phase reactions are preferred to those that take place in a solvent. The method of Sisler et al. is suitable, as disclosed in U.S. Pat. 2,710,248 granted June 7, 1955, and even more advantageous is the method of Laughlin described in Chemiker-Zeitung 92, (11), 383 (1968).

Laughlin dilutes the ammonia stream with nitrogen and obtains 60–70% conversion of chlorine to chloramine according to the equation:

$$Cl_2(g) + 2NH_3(g) \rightarrow NH_2Cl(g) + NH_4Cl(s)$$

The only reported side-reaction product is nitrogen whose formation follows the equation:

$$3Cl_2 + 8NH_3 \rightarrow N_2 + 6NH_4Cl$$

Chloramine generation therefore generally consists of bringing together chlorine and an excess of ammonia to form an exit-gas mixture of chloramine, free ammonia, and nitrogen. Optionally, additional nitrogen can be added as a diluent; it passes unchanged into the exit-gas mixture. Ordinarily the inlet gas streams are metered and are introduced into the generator through jets to secure good mixing; the ammonium chloride smoke is filtered out; and the exit gases are discharged over a period of time into the reaction mixture which is discussed below. This distinction between the "ammonia," which is admitted to chloramine generator, and the "free ammonia," which is discharged into the reaction mixture after all the chlorine has reacted, is preserved throughout this specification.

The gas streams are most conveniently introduced into the chloramine generator at room temperature. Heat of reaction raises the temperature at the precise point where the chloramine and ammonia mix to about 200–260° C.; however immediate dilution by the excess of ammonia and the nitrogen, if used, brings the temperature down to about 40–100° C. at a point 10 cm. away from this point of mixing.

Avoidance of the undesired and potentially explosive dichloramine and trichloramine is conveniently accomplished by introducing, into the chloramine generator, chlorine and ammonia in a mol ratio of from about 1:3 to about 1:10, and introducing diluent nitrogen as necessary to bring the mol ratio of chlorine to (ammonia plus nitrogen) into the range from about 1:6 to about 1:16. Specific mol ratios which have proved satisfactory are given below. A preferred ratio of chlorine:ammonia:nitrogen is 1:4:10.

| Chlorine | Ammonia | Nitrogen | Ammonia plus nitrogen |
| --- | --- | --- | --- |
| 1 | 10 |  | 10 |
| 1 | 2.7 | 3.2 | 5.9 |
| 1 | 4 | 10 | 14 |
| 1 | 6 | 10 | 16 |

Step (b).—The dialkyl sulfide used in the process of the instant invention can be obtained from any convenient source. It is well known in the art to prepare this compound by adding alkyl mercaptan to commercially available alpha olefin in the presence of a free-radical initiator such as peroxide. Alternatively, alkyl mercaptide can be reacted with alkyl bromide to prepare dialkyl sulfide.

The sulfides used in the instant invention are long chain, asymmetrical, alkyl sulfides $R^1$—S—$R^2$ wherein $R^1$ is an alkyl group having from about 6 to about 20 carbon atoms and $R^2$ is an alkyl group having from 1 to about 3 carbon atoms. Either $R^1$ or $R^2$ can have monohydroxy substitution in the $\beta$ or $\gamma$ position. Sulfides that can be used in the process of this invention include, but are not limited to, methyl octyl sulfide, methyl nonyl sulfide, methyl decyl sulfide, methyl undecyl sulfide, methyl dodecyl sulfide, methyl tetradecyl sulfide, methyl hexadecyl sulfide, methyl octadecyl sulfide, methyl eicosyl sulfide, ethyl decyl sulfide, ethyl tetradecyl sulfide, 2-hydroxyethyl decyl sulfide, ethyl - 3 - hydroxydodecyl sulfide, n-propyl decyl sulfide, 3 - hydroxy - n - propyl tetradecyl sulfide, isopropyl octyl sulfide, and isopropyl-2-hydroxy hexadecyl sulfide.

The dialkyl sulfide described above is dissolved in a solvent to form a solution thereof.

Preferably dialkyl sulfides are those wherein $R^1$ is a normal alkyl group having from about 12 to about 20 carbon atoms for certain embodiments of the invention and having from about 8 to about 14 carbon atoms for other embodiments of the invention.

Step (c).—This step comprises introducing the exit-gas mixture of Step (a) into the solution of Step (b). This is done by bubbling the gas through the solution in the conventional way that is well known to those skilled in the art.

Step (d).—This step comprises reacting the chloramine with the dialkyl sulfide to form the corresponding dialkyl sulfiminium chloride. The chemical reaction, Equation 1, is repeated here for clarity:

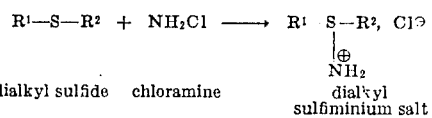

dialkyl sulfide    chloramine      dialkyl sulfiminium salt

The chloramine adds, mol for mol, to the sulfide to form the ionic sulfiminium salt. However, in the conventional mode of carrying out this basic reaction, other reactions can also occur, leading to undesirably by-products. Sulfoxide, sulfoximine, sulfone diimine, and bis(sulfuranylidene)ammonium chloride have been identified in the reaction mixture when dialkyl sulfide and chloramine have been brought together according to the teachings of the prior art.

Temperature of the reaction of Equation 1 is governed by normal factors. It is generally recognized by organic chemists that lower temperatures tend to increase selectivity of reaction, while high temperatures increase reaction rates. Temperatures below about 15° C. are preferred. In fact temperatures ranging from —10° C. to 0° C. are used for laboratory syntheses, although for larger scale work where time is more important temperatures ranging from about 5° C. to about 15° C. are a preferred compromise between the two abovementioned factors.

After the introduction of chloramine into the reaction vessel has been completed, a substantial amount of unreacted chloramine remains dissolved in the reaction mixture. Accordingly, it is good practice to allow the mixture to warm up to room temperature gradually over a period of several hours. Thus the final portion of the reaction is completed at substantially ambient temperature.

The ratio of chloramine to sulfide is another variable that is governed by normal factors. In general a ratio higher than 1.0:1 is undesirable because this tends to promote formation of diimine. A ratio lower than about 0.5:1 requires excessive recycle of the unreacted sulfide and is not necessary to substantially avoid making large quantities of diimine. The preferred range is therefore about 0.5:1 to 1.0:1.

Step (e).—It has not hitherto been appreciated that the reason for the side-reaction products mentioned above is that the sulfiminium salt is acidic in nature and can readily react with the free ammonia to form the sulfilimine by means of a secondary and undesirable reaction:

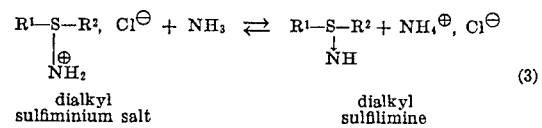

dialkyl sulfiminium salt      dialkyl sulfilimine (3)

The sulfilimine has been well known for many years to be a chemically reactive and unstable material, spontaneously decomposing even at a temperature as low as 0° C. [Appel. cited previously, and Kharasch, "Organic Sulfur Compounds," vol. 1, chapter 29, Pergamon Press, N.Y. (1961)]. By way of contrast, sulfiminium chloride is highly stable, resistant to hydrolysis, and can be stored indefinitely at room temperature.

Under prior-art conditions, the excess free ammonia from the chloramine generator forces the equilibrium of the secondary reaction of Equation 3 toward the right, leading to the formation of the unstable sulfilimine. [As discussed supra, this ammonia is required to be present in the chloramine generator to avoid formation of dichloramine and trichloroamine.]

Along with the discovery of this underlying principle, concrete means of suppressing sulfilimine formation have now been achieved in accordance with this invention. The key factor is to carry out the desired reaction of Equation 1 under such conditions that at least one of the reactants of Equation 3 precipitates from the reaction mixture and is no longer available to participate in this second, undesired, reaction. This can be accomplished by precipitating the dialkyl sulfiminium chloride; precipitating the free ammonia; or precipitating the dialkyl sulfiminium chloride together with precipitating the ammonia. These steps represent separate and distinct embodiments of the invention: (A) using a specific solvent, or (B) carrying out the chlorination in the presence of an acidic buffer such as carbon dioxide, or (C) a combination of (A) and (B).

Embodiment A.—One embodiment of Step (e) of the instant invention lies in the use of a solvent of such properties that the desired reaction product of Equation 1, i.e., the sulfiminium chloride, is not soluble in the reaction mixture and therefore precipitates. This effectively removes it from the mixture so far as chemical reaction is concerned and forces the equilibrium of the secondary reaction of Equation 2 toward the left.

Proper selection of solvent requires, however, not only this consideration but also several others. The solvent must dissolve the sulfide that it is desired to transform into the sulfiminium salt. In addition the solvent must itself be chemically inert toward all the constituents of the reaction mixture. The solvent should be relatively safe, cheap, and available. And lastly it must have the correct polarity to facilitate formation of the polar transition state in the desired reaction (1). [This reaction concerns two neutral molecules coming together to form an ionic product. While the exact nature of the transition state (highest energy state between reactants and products) is not known, it must have at least some charge separation and may be represented as $$\overset{\delta+}{R_2S}\text{—}\overset{\delta-}{NH_2}\text{—}Cl$$

A solvent of higher polarity than that appropriate to the neutral starting material will increase the stability of the transition state relative to the neutral starting materials, reduce the activation energy, and hence increase the rate of reaction.]

The solvents that have been discovered to meet all of these criteria are tetrahydrofuran

dioxane

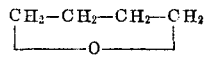

propionitrile $CH_3CH_2CN$, and butyronitrile $C_3H_7CN$. These solvents may be mixed with each other in any proportion, or they may be mixed with diethyl ether $CH_3\text{—}CH_2\text{—}O\text{—}CH_2\text{—}CH_3$ in proportions such that the diethyl ether comprises on a weight basis no more than about 60% of the total solvent.

A consideration in this embodiment is that the "long-chain" in the asymmetrical dialkyl sulfide, i.e., $R^1$ in the equations as written, preferably contains from about 12 about 20 carbon atoms to achieve optimum precipitation of the sulfiminium chloride. It has been found that when the long chain of the asymmetrical dialkyl sulfiminium salt contains at least 12 carbon atoms it crystallizes quite well and substantially completely precipitates in the reaction mixture when using the specific solvents set forth above.

The solvents enumerated above which have been found suitable for the process of this invention were unexpected and were not susceptible to prediction in the context of the invention. Alcohols are not satisfactory because they are reactive with other components of the system. Diethyl ether and capronitrile are not polar enough to participate effectively in the polar transition state, while acetonitrile is too polar to dissolve the asymmetrical long chain sulfides which are the reactants. The common parameters of solvent polarity, dipole moment ($\lambda$) and dielective constant ($\epsilon$), do not distinguish the preferred solvents over the others and cannot be used to characterize the operable solvents of this invention.

If chloramine is generated by a reaction taking place in a solvent, it is intended that this minor amount of solvent be neglected for the purpose of selecting a solvent to carry out the purposes of this invention. This complication is completely avoided, of course, by using the preferred gas-phase generation of chloramine.

The process of Embodiment A thus prefers an $R^1$ chain length in the dialkyl sulfide of from about 12 to about 20 carbon atoms, and comprises precipitating the sulfiminium chloride by carrying out the reaction in a solvent selected from the group consisting of tetrahydrofuran, dioxane, propionitrile, butyronitrile, and mixtures of any of the foregoing solvents with each other or with diethyl ether in proportions such that the diethyl ether represents on a weight basis no more than about 60% of the total solvent.

Preferred solvents for Embodiment A are tetrahydrofuran, propionitrile, and a mixture of tetrahydrofuran with diethyl ether in proportions such that the diethyl ether comprises on a weight basis no more than about 60% of the total solvent. Among tetrahydrofuran/diethyl ether mixtures, those such that the percent diethyl ether on a weight basis is from 40% to 60% are especially preferred.

The following examples illustrate the practice of this embodiment of the invention. It will be understood that they are intended to be illustrative only and are not limiting in scope.

Example I

In a 1-liter, three-neck, round-bottom flask equipped with stirrer, 10 mm. gas inlet tube, thermometer, and about 1 foot of rubber tubing as an exit were placed 96.7 grams (about 0.4 mol) methyl tetradecyl sulfide (prepared from tetradecyl bromide and methyl mercaptide) dissolved in 400 ml. tetrahydrofuran. Chloramine/ammonia from a generator operating at 10 millimols/min. chlorine and 100 millimols/min. ammonia was passed in for 30 minutes. [This produced 0.2 mol of chloramine and 2.3 mols of free ammonia.] During this period the flask was cooled by a salt-and-ice bath and maintained between $-10°$ C. to $0°$ C. A heavy crystalline precipitate formed. The flask and its cooling bath were allowed to stand until they warmed to room temperature, which took about 3½ hours. At that time the test for chloramine was weak (discussed below).

Filtration gave 49.9 grams of white solid which was taken up in 150 ml. methylene chloride and a like amount of acetone. After a pressure filtration to remove traces of ammonium chloride the solution was cooled on ice to give methyl tetradecyl sulfiminium chloride. First crop 40.9 grams; melted with decomposition of 157–164° C. Second crop by cooling on ice-methanol, 2.5 grams.

Unreacted sulfide was recovered from the tetrahydrofuran filtrate by adding 500 ml. $H_2O$, 175 ml. petroleum ether, and 50 ml. methanol. After shaking, the layers were allowed to separate overnight and the petroleum ether layer was removed and evaporated to give 54 grams of light yellow methyl tetradecyl sulfide.

From the data above the following table was computed, wherein all the numbers are on a mol basis:

|  | Charged | Recovered | Consumed |
|---|---|---|---|
| Methyl tetradecyl sulfide | 0.396 | 0.221 | 0.175 |
| Chloramine | 0.2 |  | 0.2 |
| Methyl tetradecyl sulfiminium chloride | 0 | 0.147 |  |

The yield on the basis of chloramine consumed was $$\frac{0.147 \text{ mol}}{0.2 \text{ mol}} \times 100 = 73\%$$

The yield on the basis of sulfide consumed was $$\frac{0.147 \text{ mol}}{0.175 \text{ mol}} \times 100 = 84\%$$

The purity of the crude sulfiminium salt was $$\frac{43.4 \text{ grams}}{49.9 \text{ grams}} \times 100 = 87\% \text{ (minimum)}$$

In this example the ratio of chloramine to sulfide was approximately 0.5:1.

The test for chloramine referred to supra was conducted as follows: About 1 ml. of the reaction mixture was added to about 1 ml. of a solution 0.5 M in both KI and $KH_2PO_4$ and the mixture was shaken vigorously. When present, chloramine liberated free iodine which was readily distinguished by its brown color.

The process of Example I is repeated except that chloroform replaces tetrahydrofuran. At the end of the reaction no heavy precipitate is observed in the reaction mixture. [A hazy precipitate of ammonium chloride may be present if it is not filtered out completely in the chloramine generator.] The reaction mixture shows a sulfiminium chloride yield of about 50% (based on chloramine) and about 10 to 15% diimine compounds. This process lies outside the operable range of the instant invention and obtains poor results because the solvent chloroform does not cause the product sulfiminium chloride to precipitate [and in the absence of carbon dioxide or other acidic material such as taught in Embodiment B of the instant invention, the free ammonia does not precipitate either.] As a consequence the dissolved sulfiminium chloride reacts with the dissolved ammonia to form sulfilimine and the various decomposition and further reaction products that result therefrom.

Example II

In the same apparatus used for the process of Example I were placed 78 grams of coconut (alkyl) methyl sulfide dissolved in a mixture of 250 ml. diethyl ether and 250 ml. tetrahydrofuran. Chloramine was passed in at 6 millimols/min. for 30 minutes from a generator operating at 10 millimols/min, chlorine, 40 millimols/min. ammonia, and 100 millimols/min. nitrogen. [Total chloramine produced was 0.18 mol and free ammonia produced was 5.2 mols.] During this time the temperature was maintained at —5° C. A heavy crystalline precipitate formed. The reaction mixture was allowed to warm gradually to room temperature and stand overnight. The reaction mix was filtered and the filtrate stripped of solvent. The residue was extracted with 200 ml. diethyl ether. The ether was stripped to leave 37 grams recovered sulfide and 4.2 grams crude sulfiminium chloride. The filter cake from the first filtration was extracted with 250 ml. chloroform, leaving behind inorganic salts. The chloroform-soluble material was isolated by evaporation and was extracted with 200 ml. diethyl ether. The ether-insoluble coconut (alkyl) methyl sulfiminium chloride remained (39 grams).

A table like that given in Example I, wherein all numbers are again on a mol basis, is:

|  | Charged | Recovered | Consumed |
|---|---|---|---|
| Coconut (alkyl) methyl sulfide | 0.35 | 0.165 | 0.185 |
| Chloramine | 0.18 |  | 0.18 |
| Coconut (alkyl) methyl sulfiminium salt |  | 0.156 |  |

The yield on the basis of chloramine consumed was 0.156/0.18=87%

The yield on the basis of sulfide consumed was 0.156/0.185=84%

If the sulfiminium chloride present in the filter cake from the first filtration had been the only portion recovered, the yields would have been 78% and 76% respectively on the two bases calculated above.

Example III

In the same apparatus used for the process of Example I were placed 93 grams of dodecyl 2-hydroxyethyl sulfide dissolved in 400 ml. tetrahydrofuran. Chloramine was generated in the manner of Example II and passed into the reaction mixture at —10° C. to 0° C. for 40 minutes. A heavy crystalline precipitate. The mixture was allowed to warm slowly over a 3½ hour period and then was filtered. Crystals of the sulfiminium chloride which appeared in the filtrate were collected and washed with ether, yielding 8 grams. The remainder was recovered from the filter cake by chloroform extraction followed by evaporation, yielding 32 grams of sulfiminium chloride.

|  | Charged | Recovered | Consumed |
|---|---|---|---|
| Dodecyl 2-hydroxyethyl sulfide | 0.37 | (¹) | (¹) |
| Chloramine | 0.24 |  | 0.24 |
| Dodecyl 2-hydroxyethyl sulfiminium chloride | 0 | 0.133 |  |

¹ Not measured.

Yield on a chloramine basis was 55%.

Example IV

Example I was repeated except that methyl decyl sulfide was used instead of methyl tetradecyl sulfide, and the solvent was propionitrile instead of tetrahydrofuran. The yield and purity were substantially identical to those of Example I.

Dioxane or butyronitrile can also be substituted for the tetrahydrofuran used in Example I, with resultant yield and purity substantially identical to those of Example I.

Embodiment B.—A second embodiment of step (e) of the instant invention is to carry out the chloramination reaction in the presence of an acidic buffer. Acid substances react with the free ammonia discharging from the chloramine generator to form acidic salts that precipitate in the reaction mixture.

It has been found that gaseous carbon dioxide, $CO_2$, is highly effective for this purpose. By adding carbon dioxide to the reaction mixture simultaneously with the exit gases from the chloramine generator, the free ammonia is precipitated as ammonium carbamate $$H_2NCOONH_4$$

Carbon dioxide removes free ammonia from the reaction mixture and effectively suppresses the progress of the secondary reaction of Equation 3 without in any way affecting the desired reaction.

Acid buffering can be accomplished by controlling the rate of introduction of the carbon dioxide to be equivalent to a molar ratio of from 1:1 to 4:1 based on the rate of introduction of the free ammonia into the reaction vessel. Within this range, a ratio of from 2:1 to 3:1 is preferred.

The "long-chain" in the asymmetrical dialkyl sulfides, i.e. $R^1$, can have from about 6 to about 20 carbon atoms. Especially preferred are those sulfides wherein $R^1$ has from about 8 to about 14 carbon atoms.

The second embodiment of step (e) of the invention therefore comprises the step of precipitating the free ammonia by introducing carbon dioxide into the reaction mixture at a rate equivalent to a molar ratio of from 1:1 to 4:1 (preferably 2:1 to 3:1) based on the rate of introduction into the reaction mixture of the free ammonia in the exit-gas mixture.

An example of the use of carbon dioxide to produce unexpectedly high yields of sulfiminium chloride is given below. A solvent is required in this embodiment which dissolves the dialkyl sulfide, which is chemically inert, and which has a polarity appropriate to form the polar transition state. However, the solvent need not, in this embodiment of the invention, precipitate the dialkyl sulfiminium chloride.

Example V

In the apparatus of Example I is placed 78 grams of coconut (alkyl) methyl sulfide dissolved in 500 ml. chloroform. Chloramine is passed in at 6 millimols/min. for 30 minutes from a generator operating at 10 millimols/min. chlorine, 40 millimols/min. ammonia, and 100 millimols/min. nitrogen. [Chloramine production is 0.18 mol and free ammonia production is 5.2 mols.] Temperature is maintained between −10° C. and 0° C. Simultaneously during this period carbon dioxide is passed into the reaction flask through a separate inlet at the rate of 40 millimols/min. [The molar ratio of carbon dioxide to free ammonia is therefore about 2.3.] A heavy precipitate of ammonium carbamate is formed.

After 1 hour all gases are stopped and the reaction mixture is allowed to warm gradually to room temperature. After 4 hours the mixture is filtered to remove the ammonium carbamate. The coconut (alkyl) methyl sulfiminium chloride is present in the filtrate in yield substantially equivalent to that of Example I.

If purification of the sulfiminium chloride is desired, the chloroform can be removed by evaporation and the residue taken up with petroleum ether. The alkyl sulfide is dissolved by the petroleum ether and can be recovered if desired, and the sulfiminium chloride which is insoluble in the petroleum ether remains behind in purity substantially equivalent to that of Example I.

The process of Example V is repeated except that the carbon dioxide is omitted. At the end of the reaction no heavy precipitate is observed in the reaction mixture. (A hazy precipitate of ammonium chloride may be present if it is not filtered out completely in the chloramine generator.) The reaction mixture shows a sulfiminium chloride yield of about 50% (based on chloramine) and about 10 to 15% diimine compounds. This process lies outside the operable range of the instant invention and obtains poor results because the solvent chloroform does not cause the product sulfiminium chloride to precipitate and in the absence of carbon dioxide or other acidic material the free ammonia does not precipitate either. As a consequence the dissolved sulfiminium chloride reacts with the dissolved ammonia to form sulfilimine and the various decomposition and further reaction products that results therefrom.

Embodiment C.—While each of the two embodiments of step (e) of the invention discussed supra are entirely suitable for practice separately, they are very much compatible with each other. Accordingly it is another and especially preferable embodiment to combine them; i.e., to use a solvent of embodiment A together with an acid-buffered reaction mixture of embodiment B.

The process of embodiment C of step (e) therefore comprises precipitating the sulfiminium chloride by carrying out the reaction in a solvent selected as disclosed supra in the detailed discussion of embodiment A, and precipitating the free ammonia by introducing carbon dioxide into the reaction mixture as disclosed supra in the detailed discussion of embodiment B.

The "long-chain" in the asymmetrical dialkyl sulfides, i.e. $R^1$, can have from about 6 to about 20 carbon atoms. Especially preferred are those sulfides wherein $R^1$ has from about 8 to about 14 carbon atoms.

All the other considerations and preferences mentioned supra for embodiments A and B separately also apply to embodiment C.

Example VI

In a 2-liter flask equipped as was the smaller one of Example I were placed 115 grams of methyl octyl sulfide dissolved in 1000 ml. tetrahydrofuran. Chloramine was passed in at 6 millimols/min. from a generator operating at 10 millimols/min. chlorine, 40 millimols/min. ammonia, and 100 millimols/min. nitrogen. During this time the teperature was maintained between −5° C. and +5° C. Simultaneously during this period carbon dioxide was passed into the reaction flask through a separate inlet at the rate of 40 millimols/min. A heavy crystalline precipitate formed.

After 1 hour all gases were stopped and the reaction mixture was allowed to warm gradually to room temperature. After 4 hours the chloramine test was very weak and the mixture was filtered. There were obtained 67 grams of methyl octyl sulfiminium salt and 32 grams recovered sulfide.

|  | Charged | Recovered | Consumed |
|---|---|---|---|
| Methyl octyl sulfide | 0.72 | 0.20 | 0.52* |
| Chloramine | 0.36 | | 0.36 |
| Methyl octyl sulfiminium chloride | 0 | 0.32 | |

*The yield on the basis of sulfide consumed was not calculated because some sulfide was lost by volatilization during solvent stripping.

The yield on the basis of chloramine consumed on 0.32/0.36=89%.

With the efficiency of the chloramine generator at 60%, it can be calculated based on the equations presented hereinbefore that of the 10 millimols/min. chlorine passed into the chloramine generator, 6 millimols/min. reacted with 6×2=12 millimols/min. ammonia to form chloramine plus ammonium chloride, while the remaining 4 millimols/min. reacted with 4×(8/3)=10.7 millimols/min. ammonia to form nitrogen plus ammonium chloride. Therefore, the free ammonia entering the reaction mixture is 40−12−10.7=17.3 millimols/min. and the rate of the carbon dioxide addition is 40/17.3=2.3 times the rate of the free ammonia addition.

Example VII

A 173 gram quantity of dodecyl methyl sulfide was chloraminated exactly as was the methyl octyl sulfide of Example VI except that the chloramine was passed in for 2 hours. The mixture was filtered after standing overnight and the filter cake was extracted with diethyl ether to remove residual sulfide. The sulfiminium chloride was extracted from the ether-insoluble portion of the filter cake with three 500 ml. portions of chloroform. Evaporation of the chloroform gave 147 grams dodecyl methyl sulfiminium chloride.

|  | Charged | Recovered | Consumed |
|---|---|---|---|
| Dodecyl methyl sulfide | 0.80 | (¹) | (¹) |
| Chloramine | 0.72 | | 0.72 |
| Dodecyl methyl sulfiminium chloride | 0 | 0.55 | |

¹ Not measured.

Yield on the chloramine basis was 77%

In this example the ratio of chloramine to sulfide was 0.9:1.

The tetrahydrofuran of Examples VI and VII can be replaced with dioxane, propionitrile, butyronitrile, or a mixture of equal proportions tetrahydrofuran and diethyl ether, to obtain a yield of about 80–85% calculated on the basis of both chloramine and sulfide consumed.

Utility.—The long chain asymmetrical dialkyl sulfiminium salts obtained by the process of the present invention are readily oxidizable, as mentioned briefly supra, to the corresponding dialkyl sulfoximines. This chemical reaction has been set forth supra as Equation 2.

Sodium hydroxide converts the dialkyl sulfiminium chloride to the dialkyl sulfilimine which is then in turn immediately oxidized by permanganate to the desired dialkyl sulfoxide before decomposition reactions can occur. This reaction has been carried out experimentally with pure dialkyl sulfiminium chlorides to obtain a yield of about 95%. The major impurity was the corresponding sulfone.

The use of dialkyl sulfoximines as detergents is taught by J. S. Berry in U.S. Pat. 3,255,116 granted June 7, 1966 The dialkyl sulfoximines prepared as described supra are identically the same as those disclosed by Berry. For example, the methyl sulfoximine of Berry's Example 1 can be advantageously prepared by the chemistry of Equation 2 from the dodecyl methyl sulfiminium chloride made as described in Example VII of the instant invention.

Mentioned in Berry's patent are formulas, built and unbuilt, for bar, liquid, and granule compositions. The process of the instant invention is eminently suitable as one of the steps in the synthesis of Berry's sulfoximines.

Another use for the sulfiminium chlorides of the instant invention is in the preparation of bis(sulfuranylidene)ammonium salts which have both antimicrobial and fabric softening properties. An equimolar solution of dialkyl sulfiminium chloride and dialkyl sulfide can be treated with bromine or chlorine in the presence of a proton acceptor such as trialkyl amine:

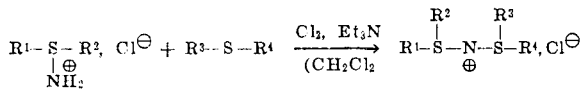

As an example of this reaction, the compound

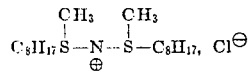

was prepared in this way. It was effective as a bactericidal agent, bacteriostatic agent, and fungicide.

As another example of this reaction, the compound

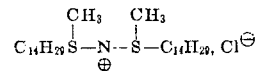

was prepared. Fabrics treated with a solution of this compound were softer to the touch than fabrics not so treated.

What is claimed is:
1. The process for preparing long chain, asymmetrical, dialkyl sulfiminium chloride in high yield and purity which comprises:
    (a) bringing together chlorine and an excess of ammonia to form an exit-gas mixture of chloramine, free ammonia, and nitrogen,
    (b) dissolving dialkyl sulfide $R^1$—S—$R^2$ in a solvent, to form a solution thereof, wherein
        $R^1$=an alkyl group having from about 6 to about 20 carbon atoms
        $R^2$=an alkyl group having from 1 to about 3 carbon atoms
        and either $R^1$ or $R^2$ can have monohydroxy substitution in the β or γ position,
    (c) introducing the exit-gas mixture of step (a) into the solution of step (b),
    (d) reacting the chloramine with the dialkyl sulfide to form the corresponding dialkyl sulfiminium chloride

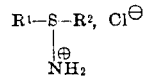

and simultaneously,
    (e) increasing the yield and purity of said sulfiminium chloride by:
        (1) precipitating the free ammonia by means of introducing carbon dioxide into the mixture at a rate equivalent to a molar ratio of from 1:1 to 4:1 based on the rate of introduction into the reaction mixture of the free ammonia in the exit-gas mixture, or
        (2) precipitating said sulfiminium chloride by carrying out the reaction of Step (d) in a solvent selected from the group consisting of tetrahydrofuran, dioxane and mixtures of these solvents with each other or with diethyl ether in proportions such that the diethyl ether comprises on a weight basis no more than about 60% of the total solvent, or
        (3) a combination of (1) and (2).

2. The process of claim 1, wherein Step (e) consists of precipitating the sulfiminium chloride by carrying out the reaction in a solvent selected from the group consisting of tetrahydrofuran, dioxane and mixtures of these solvents with each other or with diethyl ether in proportions such that the diethyl ether comprises on a weight basis no more than about 60% of the total solvent.

3. The process of claim 2 wherein $R^1$ as defined in step (b) has from about 12 to about 20 carbon atoms.

4. The process of claim 2 wherein the solvent is tetrahydrofuran or a mixture of tetrahydrofuran with diethyl ether in proportions such that the diethyl ether comprises on a weight basis no more than about 60% of the total solvent.

5. The process of claim 1 wherein step (e) consists of precipitating the free ammonia by introducing carbon dioxide into the reaction mixture at a rate equivalent to a molar ratio of from 1:1 to 4:1 based on the rate of introduction into the reaction mixture of the free ammonia in the exit-gas mixture.

6. The process of claim 1 wherein step (e) comprises (i) precipitating the free ammonia by introducing carbon dioxide into the reaction mixture at a rate equivalent to a molar ratio of from 1:1 to 4:1 based on the rate of introduction into the reaction mixture of the free ammonia in the exit-gas mixture, and (ii) precipitating the sulfiminium chloride by carrying out the reaction in a solvent selected from the group consisting of tetrahydrofuran, dioxane and mixtures of these solvents with each other or with diethyl ether in proportions such that the diethyl ether comprises on a weight basis no more than about 60% of the total solvent.

7. The process of claim 6 wherein the solvent is tetrahydrofuran or a mixture of tetrahydrofuran with diethyl ether in proportions such that the diethyl ether comprises on a weight basis no more than about 60% of the total solvent.

8. The process of claim 6 wherein
    (i) $R^1$ as defined in step (b) is a normal alkyl group having from about 8 to about 14 carbon atoms;
    (ii) the free ammonia precipitating by introducing carbon dioxide into the reaction mixture at a rate equivalent to a molar ratio of from 2:1 to 3:1 based on the rate of introduction into the reaction mixture of the free ammonia in the exit-gas mixture; and
    (iii) the solvent is tetrahydrofuran or a mixture of tetrahydrofuran with diethyl ether such that the percent diethyl ether on a weight basis is from 40% to 60%.

References Cited

UNITED STATES PATENTS 2,710,248  1/1950  Sisler et al. _____ 23—100
3,226,425  12/1965  Barrett _____ 260—371

OTHER REFERENCES

Chem. Ber, vol. 95: 849 and 853 (1962), Appel et al.
Chem. Ber, vol. 99: 3108 and 3114 (1966), Appel et al.
Fundamentals of Physical Chemistry, John Wiley & Sons, Inc., (1959), pp. 172–173, Crockford & Knight.

HENRY R. JILES, Primary Examiner

S. D. WINTERS, Assistant Examiner

U.S. Cl. X.R.

260—609 A, 607 R; 252—95

UNITED STATES PATENT OFFICE
CERTIFICATE OF CORRECTION

Patent No. 3,654,359  Dated April 4, 1972

Inventor(s) Eugene P. Gosselink and Robert G. Laughlin

It is certified that error appears in the above-identified patent and that said Letters Patent are hereby corrected as shown below:

Column 1, line 55, delete "
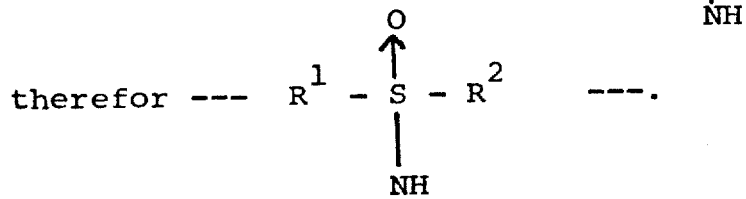
" and insert therefor ---

$$R^1 - \overset{\overset{\displaystyle O}{\uparrow}}{\underset{\displaystyle NH}{S}} - R^2$$

---.

Column 4, line 18, delete "undesirably" and insert therefor --- undesirable ---.

Column 5, line 1, delete "discover" and insert therefor --- discovery ---.

Column 5, line 64, before "about" insert --- to ---.

Signed and sealed this 1st day of August 1972.

(SEAL)
Attest:

EDWARD M. FLETCHER, JR.
Attesting Officer

ROBERT GOTTSCHALK
Commissioner of Patents